(12) United States Patent
Chan et al.

(10) Patent No.: US 8,000,425 B2
(45) Date of Patent: Aug. 16, 2011

(54) METHODS AND APPARATUS TO PROVIDE CLOCK RESYNCHRONIZATION IN COMMUNICATION NETWORKS

(75) Inventors: Chung San Roger Chan, Coppell, TX (US); Richard M Prentice, Wylie, TX (US); Woo Jin Kim, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1239 days.

(21) Appl. No.: 11/653,534

(22) Filed: Jan. 16, 2007

(65) Prior Publication Data

US 2008/0159459 A1  Jul. 3, 2008

Related U.S. Application Data

(60) Provisional application No. 60/877,888, filed on Dec. 29, 2006.

(51) Int. Cl.
*H04L 7/00* (2006.01)
(52) U.S. Cl. ....................................... 375/354
(58) Field of Classification Search .................. 375/354, 375/357, 369, 372, 373, 374, 371; 370/395.62, 370/507; 455/265; 702/89; 713/375, 400
See application file for complete search history.

(56) References Cited

U.S. PATENT DOCUMENTS

| 7,209,008 | B2 * | 4/2007 | Opris | 331/12 |
| 7,616,686 | B2 * | 11/2009 | Aziz et al. | 375/233 |
| 2005/0013351 | A1 * | 1/2005 | Paul | 375/150 |
| 2008/0130809 | A1 * | 6/2008 | Kong et al. | 375/355 |

OTHER PUBLICATIONS

Texas Instruments Incorporated, "TLK1211, Gigabit Ethernet Serdes for PON", http://focus.ti.com/docs/prod/folders/print/tk11211.html, 3 pages, printed Jan. 12, 2007.
Texas Instruments Incorporated, "TLK1211RCP: Ethernet Transceivers," SLLS658—Sep. 2006, 20 pages.
Texas Instruments Incorporated, "TLK1201RCP, TLK1201IRCP: Ethernet Transceivers," SLLS506D—Aug. 2001—Revised Aug. 2004, 21 pages.
Texas Instruments Incorporated, "Interface Selection Guide," 4Q 2006, 49 pages.

* cited by examiner

*Primary Examiner* — Sam K Ahn
(74) *Attorney, Agent, or Firm* — John J. Patti; Wade J. Brady, III; Frederick J. Telecky, Jr.

(57) ABSTRACT

Methods and apparatus to provide clock resynchronization in communication networks are disclosed. An example method of clock resynchronization disclosed herein comprises determining a vote based on adjacent samples occurring within a single bit interval in a sampled data stream, wherein the vote comprises an early vote when the adjacent samples indicate a sampling phase of a sampling clock is early relative to a center position in the bit interval and wherein the vote comprises a late vote when adjacent samples indicate the sampling phase is late relative to the center position, tracking a running difference between a number of early votes and a number of late votes in a plurality of votes corresponding to a plurality of adjacent samples, and adjusting the sampling phase when the running difference reaches a threshold.

23 Claims, 7 Drawing Sheets

METHODS AND APPARATUS TO PROVIDE CLOCK RESYNCHRONIZATION IN COMMUNICATION NETWORKS

RELATED APPLICATION

This patent claims priority from U.S. Provisional Application Ser. No. 60/877,888, entitled "Methods and Apparatus to Provide Clock Resynchronization in Communication Networks" and filed on Dec. 29, 2006 now abandoned. U.S. Provisional Application Ser. No. 60/877,888 is hereby incorporated by reference in its entirety.

FIELD OF THE DISCLOSURE

This disclosure relates generally to communication networks and, more particularly, to methods and apparatus to provide clock resynchronization in communication networks.

BACKGROUND

Broadband communication networks provide high-speed data communication to many residential neighborhoods and commercial locations. To achieve efficient and reliable data transmission over a broadband communication link, sampling clocks used to sample and receive data must acquire synchronization with the transmitted data stream. In many broadband communication systems, downstream data is broadcast from a central office to all network units served by the central office. A particular network unit will decode only those portions of the downstream data which are addressed to it. As such, the downstream data link is relatively long-lived and the time to initially acquire sampling clock synchronization will have negligible effect on the performance of the downstream data link.

However, many broadband communication systems do not provide a similar long-lived data link for upstream data. Instead, the upstream data link is shared such that each network unit served by the central office is assigned a particular window during which the network unit may transmit its upstream data. The sampling clocks used to sample and receive data sample on the upstream data link must, therefore, resynchronize with each network unit each time the network unit's transmission window begins. Because the transmission windows are usually not long-lived, the time to acquire resynchronization may have a significant impact on the performance of the upstream data link.

DETAILED DESCRIPTION

Figure 1:
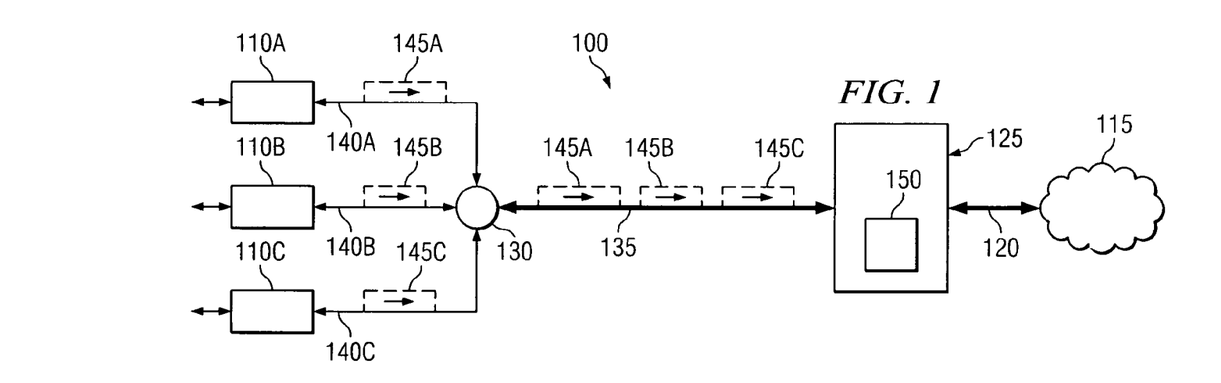
FIG. 1 is a block diagram of an example communication network employing clock resynchronization.

A block diagram of an example communication network 100 capable of employing the methods and apparatus for clock resynchronization disclosed herein is shown in FIG. 1. The communication network 100 of the illustrated example implements a passive optical network (PON), such as, for example, an Ethernet PON (EPON) or a Gigabit Ethernet PON (GePON). However, persons of ordinary skill in the art will appreciate that the methods and apparatus disclosed herein may be readily adapted for use in other communication networks, such as, for example, digital cable broadband networks, digital subscriber line (DSL) networks, etc. In such other implementations, the optical network elements shown in the example implementation of FIG. 1 may be replaced with network elements having similar functionality but that are compatible with the communication medium of the particular communication network.

Returning to the example implementation illustrated in FIG. 1, the example communication network 100 includes example optical network units (ONUs) 110A, 110B and 110C. The example communication network 100 provides connectivity between the ONUs 110A, 110B, 110C and a wide area network (WAN) 115. The WAN 115 may be any type of WAN, such as for example, the Internet, a proprietary communication network, etc. Each of the example ONUs 110A, 110B and 110C may be located at any appropriate network access site, such as a customer premises, a user work area, etc. Persons having ordinary skill in the art will appreciate that, although three ONUs 110A, 110B, 110C are shown in FIG. 1, the example communication network 100 may include any number of ONUs.

The communication network 100 of the illustrated example includes a fiber trunk 120 to connect the WAN 115 to an example optical line terminal (OLT) 125. The fiber trunk 120 may connect to the WAN 115 through a central office or similar centralized facility (not shown). The example OLT 125 may be located in the vicinity of the example ONUs 110A, 110B, 110C, such as, for example, in a residential subdivision, an office park, etc. A passive optical splitter 130 is used to split a main fiber strand 135 from the example OLT 125 into individual fiber strands 140A, 140B and 140C. The individual Fiber strands 140A, 140B and 140C connect the example OLT 125 to the respective example ONUs 110A, 110B and 110C as shown.

In the communication network 100 of the illustrated example, downstream data is broadcast from the example OLT 125 to all of the example ONUs 110A, 110B and 110C. The downstream data is packetized according to any appropriate communication protocol. The packetized data includes address information to allow downstream data to be targeted for receipt by a particular ONU, such as, for example, ONU 110A. Additionally, the downstream data may be encrypted to prevent other ONUs, such as, for example, ONUs 110B and 110C, from accessing data destined for ONU 110A. Because downstream data is broadcast from the OLT 125 to all of the example ONUs 110A, 110B and 110C in a substantially continuous manner, acquiring and maintaining receive synchronization in the ONUs 110A, 110B and 110C is a relatively straightforward task. Furthermore, because the downstream data link is long-lived, the initial time required to acquire synchronization lock in the ONUs 110A, 110B and 110C will have a minimal impact on overall link efficiency.

However, acquiring, maintaining and reacquiring synchronization is a significant concern for upstream data transmission from the example ONUs 110A, 110B and 110C to the example OLT 125. In the communication network 100 of the illustrated example, the example OLT 125 utilizes a shared medium, the main fiber strand 135, to receive upstream data from the example ONUs 110A, 110B and 110C. In some implementations, the example OLT 125 may be required to receive upstream data from up to 64 ONUs. The OLT 125 of the illustrated example employs a time division multiple access (TDMA) protocol for upstream data traffic to coordinate transmission of upstream data by each of the example ONUs 110A, 110B and 110C. In some example implementations, dedicated time slots are assigned to each ONU 110A, 110B, 110C to coordinate upstream data transmission. The time slots are synchronized such that transmission bursts from different ONUs do not collide.

To better understand the TDMA protocol for upstream traffic, example upstream data transmissions are also illustrated in FIG. 1. In the illustrated example, the ONU 110A is transmitting an upstream data packet 145A on the fiber strand 140A. Similarly, the ONU 110B is transmitting an upstream data packet 145B on the fiber strand 140B. Additionally, the ONU 110C is transmitting an upstream data packet 145C on the fiber strand 140C. In some implementations of the example communication network 110, the upstream data packets 145A, 145B and 145C may have variable lengths. In other implementations, the upstream data packets 145A, 145B and 145C may have fixed lengths. Returning to the illustrated example, each ONU 110A, 110B, 110C is assigned a dedicated time slot such that the upstream data packets 145A, 145B and 145C arrive at the main fiber strand 135 in a predetermined order and without collision as shown.

As the example OLT 125 cycles through the time slots of the TDMA upstream protocol, the receiver of the OLT 125 must resynchronize at the beginning of each time slot to the upstream timing of the particular ONU assigned to that particular time slot. In the example of FIG. 1, the example OLT 125 must resynchronize to the upstream timing of ONU 110A in a first time slot. Then, at the beginning of a second time slot, the OLT 125 must resynchronize to the upstream timing of ONU 110B. The OLT 125 then resynchronizes to the upstream timing of ONU 110C at the beginning of a third time slot. This resynchronization process then repeats as the example OLT 125 cycles through the time slots of the TDMA upstream protocol. Because the upstream data link in each time slot is relatively short-lived, the time to acquire resynchronization at the beginning of each time slot can substantially impact the overall efficiency (e.g., throughput) of upstream data transmission.

To provide clock resynchronization at the beginning of each upstream time slot, the example OLT 125 includes an example timing update unit 150. The example timing update unit 150 is configured to resynchronize the receive sampling clock or clocks used by the example OLT 125 to sample the upstream data received on the main fiber strand 135. The example timing update unit 150 processes the sampled upstream data to determine whether the sampling phase(s) of the receive sampling clock(s) should be advanced or retarded such that the sampling phase(s) align with appropriate sampling points in the upstream data. The example timing update unit 150 may also be configured to cause a jump in the timing of the receive sampling clock(s) when potential sampling errors are detected. In some implementations, the example timing unit 150 may interface with existing phase locked loops (PLLs) or delay locked loops (DLLs) to further enhance clock resynchronization performance.

Figure 2:
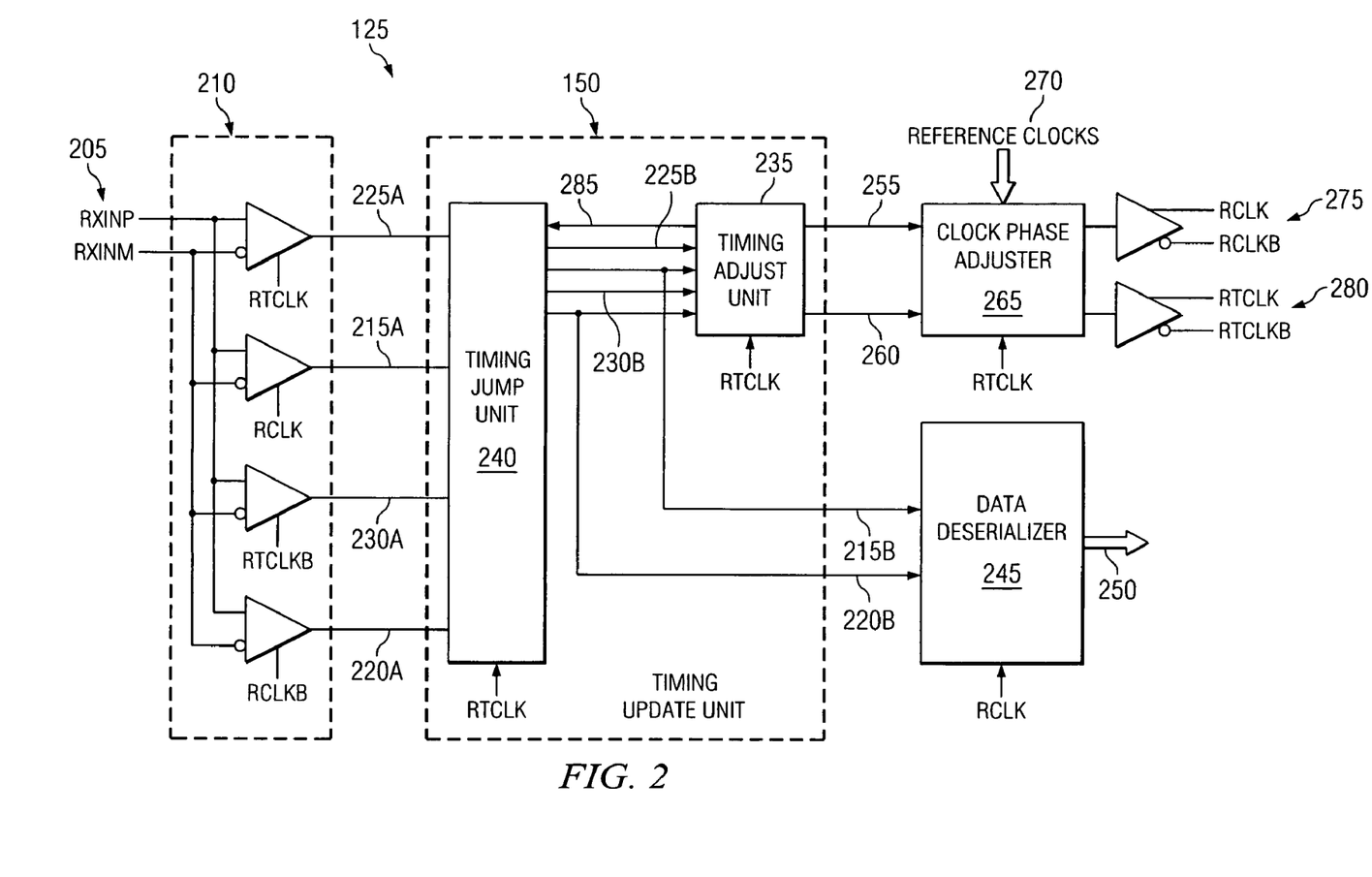
FIG. 2 is a block diagram of an example optical line terminal, which includes an example timing update unit for clock resynchronization, that may be used in the example communication network of FIG. 1.

A block diagram of an example implementation of the OLT 125, which includes an example implementation of the timing unit 150, that may be used to implement the example communication network 100 of FIG. 1 is illustrated in FIG. 2. The example OLT 125 of FIG. 2 includes a differential input 205 for receiving upstream data from, for example, the main fiber strand 135 of FIG. 1. The upstream signal received at the differential input 205 is sampled by a data sampler 210. The data sampler 210 included in the OLT 125 of the illustrated example utilizes two sampling clocks to sample the received upstream signal. The first sampling clock is a receive sampling clock used to sample the received upstream signal at the baud rate of the upstream data. Nominally, the data samples generated based on the receive sampling clock form the detected upstream data stream output by the example OLT 125. In some implementations, and in the particular example of FIG. 2, the receive sampling clock is a half baud rate clock and the received upstream signal is sampled both on the rising edge of receive sampling clock, denoted as RCLK, and the falling edge of the receive sampling clock, denoted as RCLKB. The upstream digital samples 215A generated based on RCLK interleaved with the upstream digital samples 220A generated based on RCLKB nominally form the detected upstream data stream output by the example OLT 125.

The second sampling clock used by the OLT 125 of the illustrated example is a lead sampling clock. The lead sampling clock is also used to sample the received upstream signal at the baud rate of the upstream data. However, the lead sampling clock is offset from the receive sampling clock by one half of a bit interval. Thus, sampling the received upstream signal using both the receive sampling clock and the lead sampling clock results in a two times (2×) oversampling of the received upstream signal. Nominally, the data samples generated based on the lead sampling clock form the additional upstream data samples resulting from oversampling the received upstream signal and are not included in the detected upstream data stream output by the example OLT 125. In some implementations, and in the particular example of FIG. 2, the lead sampling clock is a half baud rate clock and the received upstream signal is sampled both on the rising edge of lead sampling clock, denoted as RTCLK, and the falling edge of the lead sampling clock, denoted as RTCLKB. The upstream digital samples 225A generated based on RTCLK and the upstream digital samples 230A generated based on RCLKB nominally form the additional upstream data samples resulting from oversampling the received upstream signal.

Based on the foregoing discussion, the outputs of the data sampler 210 of the illustrated example form a 2× oversampled stream of data samples in which data samples occur in the order 225A, 215A, 230A and 220A. The data samples 215A and 220A nominally form the detected upstream data stream and the data samples 225A and 230A provide the 2× oversampling. The outputs of the data sampler 210 are applied to the example timing update unit 150. The timing update unit 150 of the illustrated example includes a timing adjust unit 235 and a timing jump unit 240. The example timing adjust unit 235 determines whether the sampling phases of the receive sampling clock and the lead sampling clock require adjustment based on where the sampling phases lie relative to the bit intervals associated with the data samples output by the data sampler 210. The example timing jump unit 240 implements a received sample timing jump equivalent to adjusting the sampling phases of the receive sampling clock and the lead sampling clock by one half of a bit interval.

The example timing jump unit 240 accepts as inputs the data samples 225A, 215A, 230A and 220A output by the data sampler 210. As mentioned above, because the lead sampling clock (RTCLK and RTCLKB) samples the upstream signal in advance of the receive sampling clock (RCLK and RCLKB) by one half of a bit interval, the data samples occur in the order 225A, 215A, 230A and 220A. The example timing jump unit 240 further includes a set of outputs providing the data samples 225B, 215B, 230B and 220B as shown. In the illustrated example, the data samples 225B are associated with RTCLK, the data samples 215B are associated with RCLK, the data samples 230B are associated with RTCLKB and the data samples 220B are associated with RCLKB. The example timing jump unit 240 provides the data samples 225B, 215B, 230B and 220B to the example timing adjust unit 235. The example timing jump unit 240 also provides the data samples 215B and 220B to a data deserializer 245. As discussed above, the data samples generated based on RCLK and RCLKB nominally form the detected upstream data stream output by the example OLT 125. Therefore, because the data samples 215B are associated with RCLK and the data samples 220B are associated with RCLKB, the data deserializer 245 is configured to interleave and buffer the data streams 215B and 220B to output a digital word containing the detected upstream data via a data output 250.

Examining the operation of the example timing jump unit 240 in greater detail, if no timing jump is implemented, the example timing jump unit 240 passes the data samples 225A, 215A, 230A and 220A to its outputs in the same order, such that the data samples 225B correspond to the data samples 225A, the data samples 215B correspond to the data samples 215A, the data samples 230B correspond to the data samples 230A and the data samples 220B correspond to the data samples 220A. Thus, if no timing jump is implemented, the data deserializer 245 will process the data samples 215A and 220A generated based on the receive sampling clock (RCLK and RCLKB) because these data samples correspond, respectively, to the data samples 215B and 220B. If, however, a timing jump is implemented, the example timing jump unit 240 interchanges data samples generated based on the receive sample clock with data samples generated based on the lead sample clock.

In particular, if a timing jump is implemented in the illustrated example, the timing jump unit 240 passes the data samples 225A, 215A, 230A and 220A to its outputs in an interchanged order, such that the data samples 225B correspond to the data samples 220A, the data samples 215B correspond to the data samples 225A, the data samples 230B correspond to the data samples 215A and the data samples 220B correspond to the data samples 230A. As such, the data samples 215B now correspond to RTCLK and the data samples 220B now correspond to RTCLKB. Similarly, the data samples 225B now correspond to RCLKB and the data samples 230B now correspond to RCLK. As discussed above, the lead sampling clock is offset from the receive sampling clock by one half of a bit interval. Because the data deserializer 245 processes the data samples 215B and 220B to produce the detected upstream data, but the data samples 215B and 220B now correspond to the lead sampling clock (RTCLK and RTCLKB) instead of the receive sampling clock (RCLK and RCLKB), an apparent sample timing jump of one half of a bit interval occurs from the perspective of the data deserializer 245. Thus, the timing jump unit 240 of the illustrated example implements a timing jump of one half of a bit interval by interchanging the data samples corresponding with the receive sample clock with the data samples corresponding to the lead sample clock.

The example timing adjust unit 235 also accepts as input the data samples 225B, 215B, 230B and 220B output by the example timing jump unit 240. As discussed above, the data samples 225B, 215B, 230B and 220B form a 2× oversampled stream of data samples corresponding to the received upstream signal. The example timing adjust unit 235 compares adjacent data sample pairs in the 2× oversampled data stream to determine the relative offset between the bit intervals associated With the upstream signal and the sampling phases of the receive sampling clock (RCLK and RCLKB) and the lead sampling clock (RTCLK and RTCLKB). For example, when the example timing jump unit 240 is not implementing a timing jump, the sampling phase of the receive sampling clock (RCLK and RCLKB) should correspond substantially to the center of the bit intervals of the upstream signal. By comparing adjacent data sample pairs in the 2× oversampled data stream, the example timing adjust unit 235 can determine whether the sampling phase of the receive sampling clock (and, by extension, the sampling phase of the lead sampling clock) is early or late relative to the center of the bit intervals.

Figure 3:
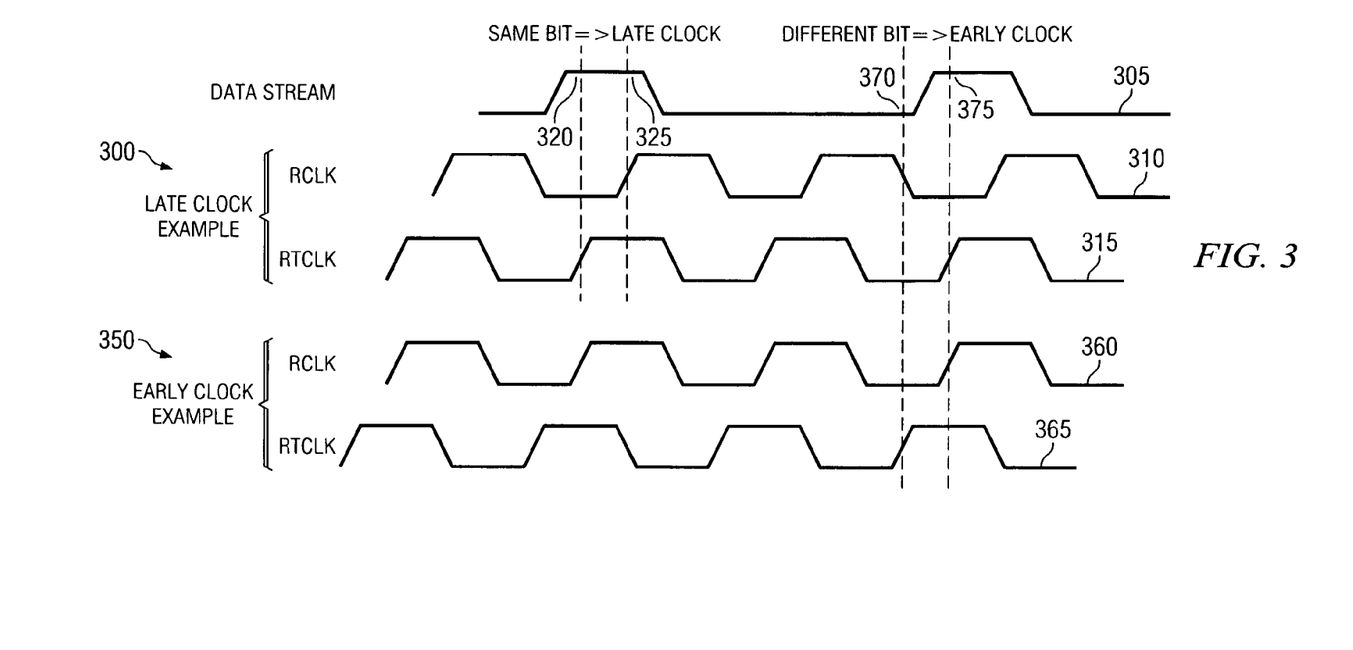
FIG. 3 illustrates waveforms associated with an example vote determination procedure for use by the example timing update unit of FIG. 2.

To more fully illustrate the operation of the example timing adjust unit 235, FIG. 3 depicts two example comparisons of adjacent data samples that indicate whether the sampling phase of the receive sample clock is early or late relative to the center of a bit interval. In a first example comparison 300 shown in FIG. 3, an upstream data signal 305 is sampled based on a receive sampling clock 310 and a lead sampling clock 315. As discussed above, the lead sampling clock 315 is offset in advance of the received sampling clock 310 by a one half bit interval. In the example comparison 300, a data sample 320 is generated based on the rising edge of the lead sampling clock 315. One half bit interval later, a data sample 325 is generated based on the rising edge of the receive sample clock 310. Because the receive sampling clock 310 in this example is late relative to the center of the bit intervals of the upstream data signal 305, the data samples 320 and 325 have substantially similar values as shown. Thus, a pair of adjacent samples having substantially similar values indicates that the sampling phase of the receive sampling clock (as well as the sampling phase of the lead sampling clock) is late relative to the center of an upstream bit interval.

In a second example comparison 350 shown in FIG. 3, the upstream data signal 305 is sampled based on a receive sampling clock 360 and a lead sampling clock 365. Again, the lead sampling clock 365 is offset in advance of the received sampling clock 360 by a one half bit interval. In the example comparison 350, a data sample 370 is generated based on the rising edge of the lead sampling clock 365. One half bit interval later, a data sample 375 is generated based on the rising edge of the receive sample clock 360. Because the receive sampling clock 360 in this example is early relative to the center of the bit intervals of the upstream data signal 305, the data samples 370 and 375 have substantially different values as shown. Thus, a pair of adjacent samples having substantially different values indicates that the sampling phase of the receive sampling clock (as well as the sampling phase of the lead sampling clock) is early relative to the center of an upstream bit interval.

Returning to FIG. 2, in some implementations, the example timing adjust unit 235 can be configured to compare an adjacent data sample pair in which the first data sample corresponds to the lead sampling clock and the second data sample corresponds to the receive sampling clock, such as in the examples of FIG. 3. In such implementations, adjacent sample pairs having substantially similar values indicate that the sampling phases of the sampling clocks are late, whereas adjacent sample pairs having substantially different values indicate that the sampling phases of the sampling clocks are early. In other implementations, the example timing adjust unit 235 can be configured to compare an adjacent data sample pair in which the first data sample corresponds to the receive sampling clock and the second data sample corresponds to the lead sampling clock. In such other implementations, persons having ordinary skill in the art will recognize that adjacent sample pairs having substantially similar values indicate that the sampling phases of the sampling clocks are now early, whereas adjacent sample pairs having substantially different values indicate that the sampling phases of the sampling clocks are late.

Each adjacent sample comparison performed by the timing adjust unit 235 of FIG. 2 yields a vote concerning whether the sampling phases of the receive and lead sampling clocks are early or late. The timing adjust unit 235 of the illustrated example is configured to determine a plurality of votes before deciding whether the sampling phases of the receive and lead sampling clocks should be adjusted. In some example implementations, the timing adjust unit 235 tracks the number of early votes and the number of late votes in the plurality of votes. Then, when the number of early votes exceeds the number of late votes by a threshold amount, the example timing adjust unit 235 triggers a sampling phase adjustment to retard the sampling phases of the receive and lead sampling clocks. Conversely, when the number of late votes exceeds the number of early votes by a threshold amount, the example timing adjust unit 235 triggers a sampling phase adjustment to advance the sampling phases of the receive and lead sampling clocks. To trigger the appropriate sampling phase adjustments, the example timing adjust unit 235 includes a direction output 255 indicating whether the sampling phases are early or late (or, equivalently, whether the sampling phases should be retarded or advanced, respectively). The example timing adjust unit 235 also includes a trigger output 260 to trigger sampling phase adjustments at the appropriate times.

The direction output 255 and the trigger output 260 are applied to a clock phase adjuster 265 as shown in FIG. 2. The clock phase adjuster 265 adjusts the phases of one or more reference clocks 270 available to the example OLT 125. The one or more reference clocks 270 may correspond to, for example, a temperature controlled crystal oscillator (TCXO), a PLL output, a DLL output, etc. When the trigger output 260 is asserted, the clock phase adjuster 265 adjusts the one or more reference clocks 270 in a direction indicated by the direction output 255. The phase adjusted one or more reference clocks 270 are then output by the clock phase adjuster 265 as the receive sampling clock 275 and the lead sampling clock 280. These updated sampling clocks are then used by the data sampler 210 to continue sampling the upstream data signal, thereby closing the feedback loop for adjusting the sampling phases of the receive and lead sampling clocks.

The example timing adjust unit 235 of FIG. 2 also includes an invalid output 285 that indicates when a comparison of adjacent samples corresponds to an invalid data transition. As discussed in greater detail below in connection with FIGS. 4 and 5, the example timing adjust unit 235 will typically assert the invalid output 285 when the sampling phases of the receive and lead sampling clocks are early (or late) by approximately one half of a bit interval. When the sampling phases are this far offset from their desired positions, the receive sampling clock may cause the upstream data signal to be sampled at the edges of the bit intervals, rather than in the center of the bit intervals. In such a scenario, the example timing jump unit 240 detects the asserted invalid output 285 and implements a one half bit interval timing jump to provide data samples to the data deserializer 245 that correspond to sampling the upstream data signal at the centers of the bit intervals.

Figure 4:
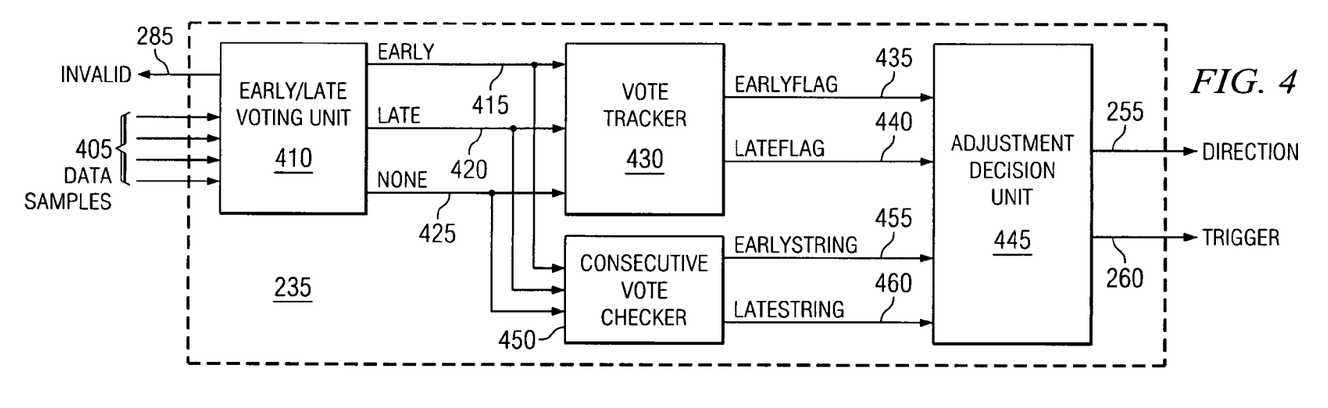
FIG. 4 is a block diagram of an example timing adjust unit that may be used to implement the example timing update unit of FIG. 2.

A block diagram of an example implementation of the timing adjust unit 235 that may be used to implement the example timing update unit 150 of FIG. 2 is illustrated in FIG. 4. The example timing adjust unit 235 of FIG. 4 accepts a 2× oversampled input data stream 405. For example, the input data stream 405 may correspond to the data stream formed by the upstream data samples 225B, 215B, 230B and 220B of FIG. 2, in which the data samples 225B correspond to sampling the upstream data signal using RTCLK, the data samples 215B correspond to sampling the upstream data signal using RCLK, the data samples 230B correspond to sampling the upstream data signal using RTCLKB and the data samples 220B correspond to sampling the upstream data signal using RCLKB.

The input data stream 405 is applied to an example early/late voting unit 410 included in the timing adjust unit 235 of the illustrated example. The example early/late voting unit 410 compares adjacent sample pairs from the input data stream 405 to determine a relative offset between the bit intervals of the upstream signal and the sampling phases of the receive and lead sampling clocks used to generate the input data stream 405. For example, and referring also to FIG. 3, the early/late voting unit 410 of the illustrated example is configured to compare adjacent sample pairs containing data samples generated by RTCLK and RCLK, respectively, as well as adjacent sample pairs containing data samples generated by RTCLB and RCLKB, respectively. As discussed above in connection with FIG. 3, an adjacent sample pair having substantially similar values is indicative of a sampling phase that is late relative to the center of a bit interval, whereas an adjacent sample pair having substantially different values is indicative of a sampling phase that is early relative to the center of the bit interval.

However, a late sampling phase indication may be misleading when no bit transitions occur in the upstream data signal. For example, if the upstream signal includes a series of logic 1 values or logic 0 values, an adjacent sample pair within such a series will have substantially similar values even though the sampling phase may not be late relative to the center of a bit interval. As such, the example early/late voting unit 410 refrains from determining whether the sampling phase is early or late when no bit transition occurs between the previous bit and the current bit associated with the adjacent sample pair under comparison. Thus, when a bit transition is detected, the early/late voting unit 410 of the illustrated example asserts an early vote 415 when the adjacent sample pair has substantially different values and asserts a late vote 420 when the adjacent sample pair has substantially similar values. However, if no bit transition is detected, the early/late voting unit 410 of the illustrated example asserts a none output 425 indicating that no early vote 415 or late vote 420 was determined.

The example timing adjust unit 235 also includes an example vote tracker 430 to track the early votes 415 and the late votes 420. For example, and as discussed above in connection with FIG. 2, the example vote tracker 430 may track the early votes 415 and the late votes 420 until the number of early votes exceeds the number of late votes by a threshold amount or the number of late votes exceeds the number of early votes by a threshold amount. When either of these events occurs, the vote tracker 430 of the illustrated example asserts either an early flag 435 of a late flag 440 as appropriate. For example, the vote tracker may assert the early flag 435 when the number of early votes exceeds the number of late votes by a threshold amount. Conversely, the vote tracker may assert the late flag 435 when the number of late votes exceeds the number of early votes by a threshold amount. Otherwise, the example vote tracker 430 refrains from asserting either the early flag 435 or the late flag 440.

An example adjustment decision unit 445 included in the example timing adjust unit 235 accepts as inputs the early flag 435 and the late flag 440 from the example vote tracker 430. The adjustment decision unit 445 of the illustrated example produces the appropriate direction output 255 corresponding to the input early flag 435 and late flag 440. For example, an asserted early flag 435 may cause the example adjustment decision unit 445 to indicate via the direction output 255 that the sampling phases of the sampling clocks used to sample the input data stream 405 should be retarded. As another example, an asserted late flag 440 may cause the example adjustment decision unit 445 to indicate via the direction output 255 that the sampling phases of the sampling clocks used to sample the input data stream 405 should be advanced. The adjustment decision unit 445 of the illustrated example also produces the trigger output 260 when either the early flag 435 or the late flag 440 are asserted to indicate that a sampling phase adjustment should be performed in the direction indicated by the direction output 255.

The example timing adjust unit 235 illustrated in FIG. 4 also includes an example consecutive vote checker 450 to determine whether a string of early votes 415 or a string of late votes 420 are output by the example early/late voting unit 410. When a string of early votes 415 is detected, the example consecutive vote checker 450 asserts an early string output 455. When a string of late votes 415 is detected, the example consecutive vote checker 450 asserts a late string output 460. The early string output 455 and the late string output 460 are accepted as inputs to the example adjustment decision unit 445 to cause, for example, an immediate phase adjustment to be initiated based on the direction output 255 and the trigger output 260. Furthermore, in some example implementations an asserted early string output 455 or late string output 460 may cause a larger than normal sampling phase adjustment to occur (e.g., by causing the trigger output 260 to remain asserted for two or more sampling phase update intervals).

As discussed above in connection with FIG. 2, the example timing adjust unit 235 of FIG. 2 also outputs an invalid output 285 that indicates when a comparison of adjacent samples corresponds to an invalid data transition. In the example implementation illustrated in FIG. 2, the example early/late voting unit 410 is responsible for generating the invalid output 285. As discussed in greater detail below in connection with FIG. 5, the example early/late voting unit 410 will typically assert the invalid output 285 when the sampling phases of the receive and lead sampling clocks used to generate the input data stream 405 are early (or late) by approximately one half of a bit interval.

Figure 5:
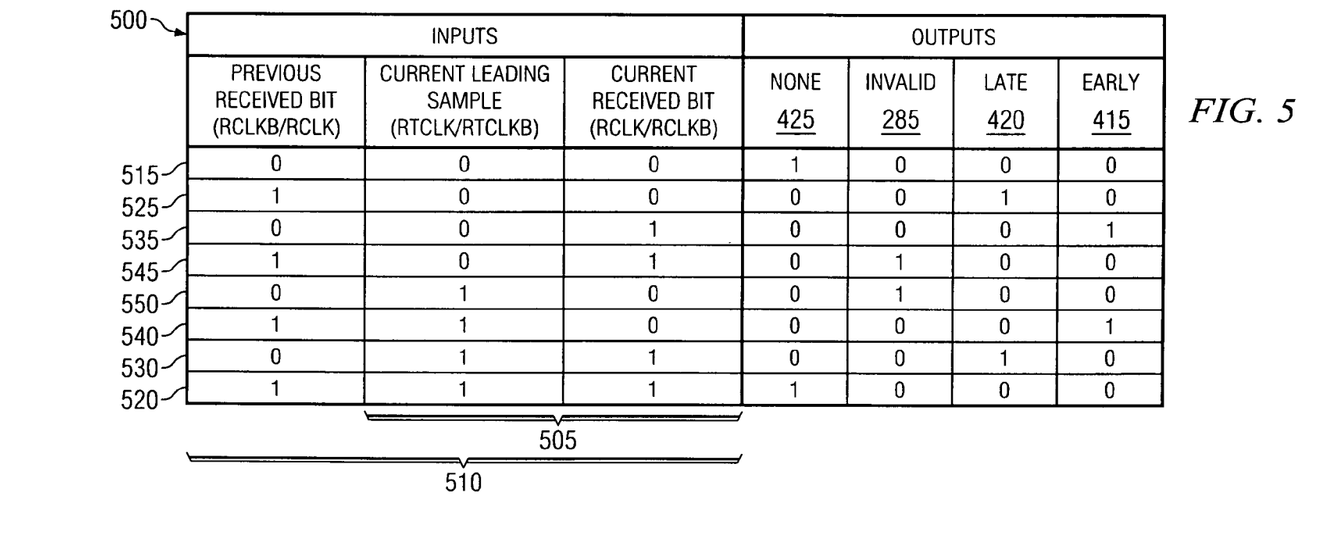
FIG. 5 illustrates an example digital logic truth table that may be used to implement the example timing adjust unit of FIG. 4.

An example truth table 500 that may be used to implement the example early/late voting unit 410 of FIG. 4 is illustrated in FIG. 5. In particular, the example truth table 500 indicates when the early vote 415, the late vote 420, the none output 425 and the invalid output 285 are asserted by the example early/late voting unit 410 based on comparing adjacent input data samples 505 and adjacent detected digital bits 510. As discussed above, the data samples corresponding to the receive sample clock (RCLK and RCLKB) nominally form the detected upstream digital bits output by the example OLT 125. The digital samples/bits corresponding to RCLKB will precede the digital samples/bits corresponding to RCLK by one bit interval. The data samples corresponding to the lead sampling clock (RTCLK and RTCLKB) occur midway between the digital samples/bits corresponding to RCLKB and the digital samples/bits corresponding to RCLK. To determine the output values of the early vote 415, the late vote 420, the none output 425 and the invalid output 285, the example early/late voting unit 410 processes three adjacent data samples as shown. In particular, the example early/late voting unit 410 will process either the triplet of data samples including a previous bit corresponding to RCLKB, a current leading sample corresponding to RTCLK and a current bit corresponding to RCLK, or the triplet of data samples including a previous bit corresponding to RCLK, current leading sample corresponding to RTCLKB and a current bit corresponding to RCLKB.

As discussed above in connection with FIG. 4, the example early/late voting unit 410 refrains from determining an early vote 415 or a late vote 420 when no bit transition occurs between the previous bit and the current bit associated with the adjacent sample pair under comparison. Thus, for the table entries 515 and 520 in which the previous bit and the current bit have the same value and, thus, no bit transition occurred, the none output 425 is asserted and the early vote 415, the late vote 420 and the invalid output 285 are not asserted. If, however, a bit transition occurs and the adjacent sample pair including the current leading sample and the current bit have substantially similar values, this indicates that the sampling phases of the received and leading sampling clocks are late (e.g., corresponding to the first example comparison 300 of FIG. 3). Thus, for the table entries 525 and 530 in which the current leading sample and the current bit have substantially similar values and a bit transition occurs between the previous bit and the current bit, the late vote 420 is asserted and the early vote 415, the none output 425 and the invalid output 285 are not asserted.

However, if a bit transition occurs and the adjacent sample pair including the current leading sample and the current bit have substantially different values, this indicates that the sampling phases of the received and leading sampling clocks are early (e.g., corresponding to the second example comparison 350 of FIG. 3). Thus, for the table entries 535 and 540 in which the current leading sample and the current bit have substantially different values and a bit transition occurs between the previous bit and the current bit, the early vote 415 is asserted and the late vote 420, the none output 425 and the invalid output 285 are not asserted. Finally, when the previous bit and current bit have substantially similar values but the intermediate current leading sample has a different value, such as in the table entries 545 and 550, the example early/late voting unit 410 asserts the invalid output 285 and does not assert the early vote 415, the late vote 420 and the none output 425. The invalid output 285 is asserted because the intermediate leading sample is located within a half bit interval from the previous bit and from the current bit and should not change when the values of the previous bit and the current bit are substantially the same. However, the intermediate leading sample could have a value different from the previous bit and the current bit when the sampling phase of the receive sampling clock is located substantially on the edge of the upstream bit intervals. As such, the invalid output 285 may be used, for example, by the timing jump unit 240 of FIG. 2, to implement a half bit timing jump to move the sampling phase towards the center of a bit interval.

Figure 6:
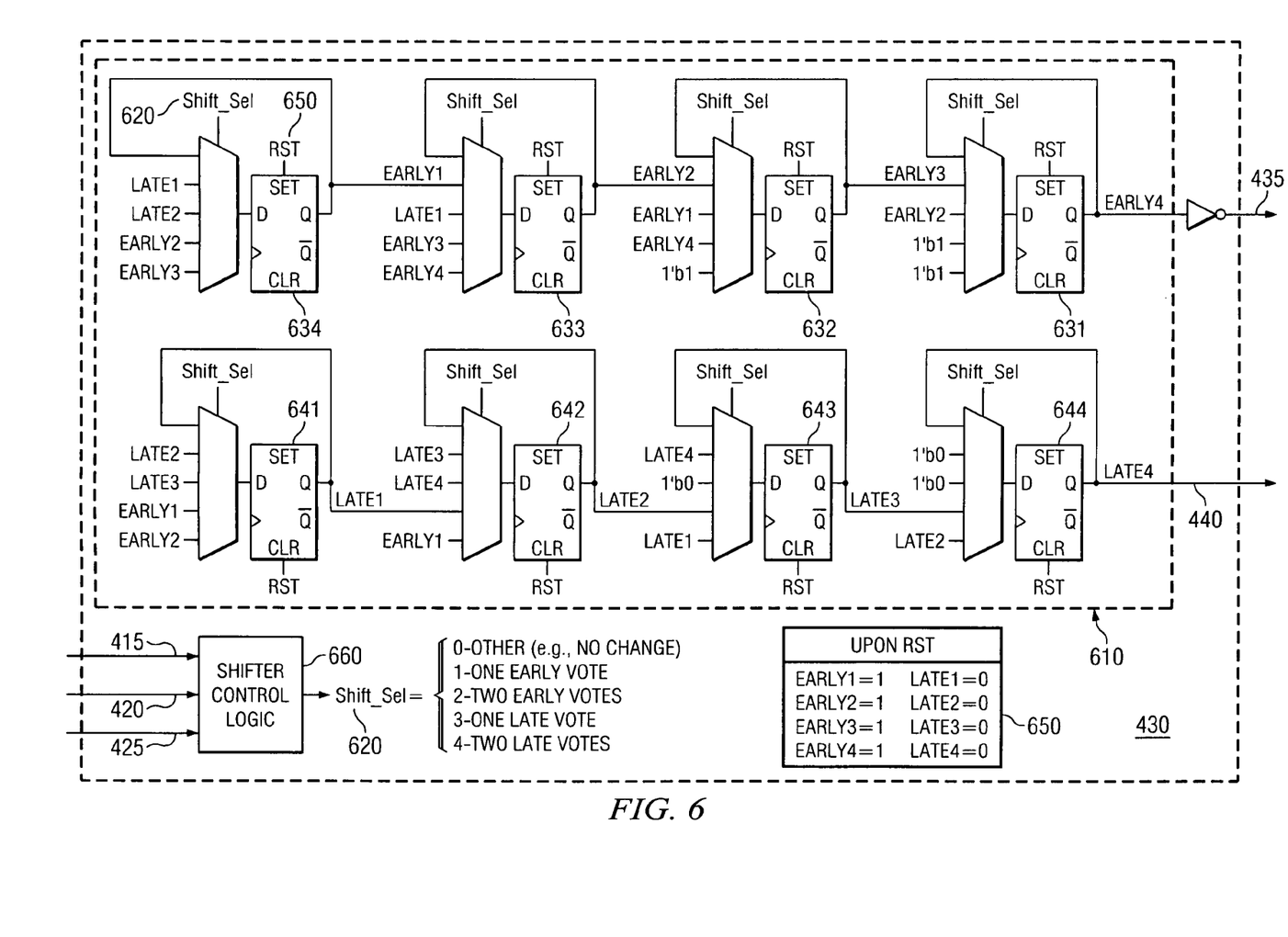
FIG. 6 is a block diagram of an example vote tracker that may be used to implement the example timing adjust unit of FIG. 4.

A block diagram of an example implementation of the vote tracker 430 that may be used to implement the example timing adjust unit 235 of FIG. 4 is illustrated in FIG. 6. The example vote tracker 430 of FIG. 6 accepts as inputs the early vote 415, the late vote 420 and the none output 425 from, for example, the early/late voting unit 410 of FIG. 4. As discussed above in connection with FIG. 4, the early vote 415 indicates that the sampling phases of the receive and lead sampling clocks are early relative to the center of a bit interval, the late vote 420 indicates that the sampling phases of the receive and lead sampling clocks are late relative to the center of a bit interval and the none output 425 indicates that no early or late vote is available.

The example vote tracker 430 of FIG. 6 includes a shift register 610 to track the number of early votes 415 and the number late votes 420 received in a plurality of votes beginning from the most recent reset of the shift register 610. The example shift register 610 is shifted in an early direction for each early vote 415 that is received. Conversely, the example shift register 610 is shifted in a late direction for each late vote 420 that is received. The shifting of the shift register 610 is controlled by a shift select signal 620 (denoted as Shift_Sel in FIG. 6).

The state of the example shift register 610 is represented by the outputs of the D flip-flops 631-634 and 641-644 in the order (631 632 633 634 641 642 643 644). The current state of the example shift register relative to its initial state tracks the running difference between the number of early votes 415 and the number late votes 420 received since the most recent reset of the example shift register 610. Resetting of the shift register 610 is controlled by a reset signal 650 (denoted as RST in FIG. 6). In the illustrated example, when the reset signal 650 is asserted, the D flip-flops 631-634 are set to logic 1 values, and the D flip-flops 641-644 are set to logic 0 values. Thus, the initial state of the example shift register 610 is (1 1 1 1 0 0 0 0).

In the vote tracker 430 of the illustrated example, an early vote 415 causes a logic 0 value to be shifted into the example shift register 610 from the right-most position. Conversely, a late vote 420 causes a logic 1 value to be shifted into the example shift register 610 from the left-most position. Thus, the number of logic 1 values in the current state of the example shift register 610, relative to the initial state of (1 1 1 1 0 0 0 0), represents the running difference between the number of early votes 415 and late votes 420 received since the most recent reset. When the shift register 610 of the illustrated example reaches its full state of (1 1 1 1 1 1 1 1), the late flag output 440 will be asserted indicating that the sampling phases of the receive and lead sampling clocks are late and should be advanced. When the full state is reached, the running difference between the number of late votes 420 and the number of early votes 415 is four. As such, the number of D flip-flops included in the lower chain of the shift register 610 (e.g., the number of D flip-flops 641-644 in the illustrated example) represents a threshold which the running difference between the number of late votes 420 and the number of early votes 415 must reach before the vote tracker 430 of the illustrated example asserts the late flag output 440.

Similarly, when the shift register 610 of the illustrated example reaches its empty state of (0 0 0 0 0 0 0 0), the early flag output 435 will be asserted indicating that the sampling phases of the receive and lead sampling clocks are early and should be retarded. When the empty state is reached, the running difference between the number of early votes 415 and the number of late votes 420 is four. As such, the number of D flip-flops included in the upper chain of the shift register 610 (e.g., the number of D flip-flops 631-634 in the illustrated example) represents a threshold which the running difference between the number of early votes 415 and the number of late votes 420 must reach before the vote tracker 430 of the illustrated example asserts the early flag output 435.

To reduce the operating frequency of the example shift register 610, the example voter tracker 430 of FIG. 4 includes shifter control logic 660 to allow the votes received via the early vote 415, the late vote 420 and the none output 425 to be buffered before processing. For example, and as shown in FIG. 6, the shifter control logic 660 causes the shift select signal 620 to have one of five possible values depending on the number of early votes 415, late votes 420 and none outputs 425 received during the most recent buffer of two votes. The multivalued nature of the shift select signal 620 allows a variable number of logic 1 values or logic 0 values to be shifted into the example shift register 610. For example, when two late votes 420 are received, the shift select signal 620 has a value of four and two logic-1 values are shifted into the example shift register 610. In another example, when two early votes 415 are received, the shift select signal 620 has a value of two and two logic-0 values are shifted into the example shift register 610. In yet another example, when one early vote 415 and one none output 425 are received, the shift select signal 620 has a value of one and one logic-0 value is shifted into the example shift register 610. In a still further example, when one late vote 420 and one none output 425 are received, the shift select signal 620 has a value of three and one logic-1 value is shifted into the example shift register 610. As a final example, when two none outputs 425 are received, or one early vote 415 and one late vote 420 are received, the shift select signal 620 has a value of zero and the state of the example shift register 610 remains unchanged.

Figure 7:
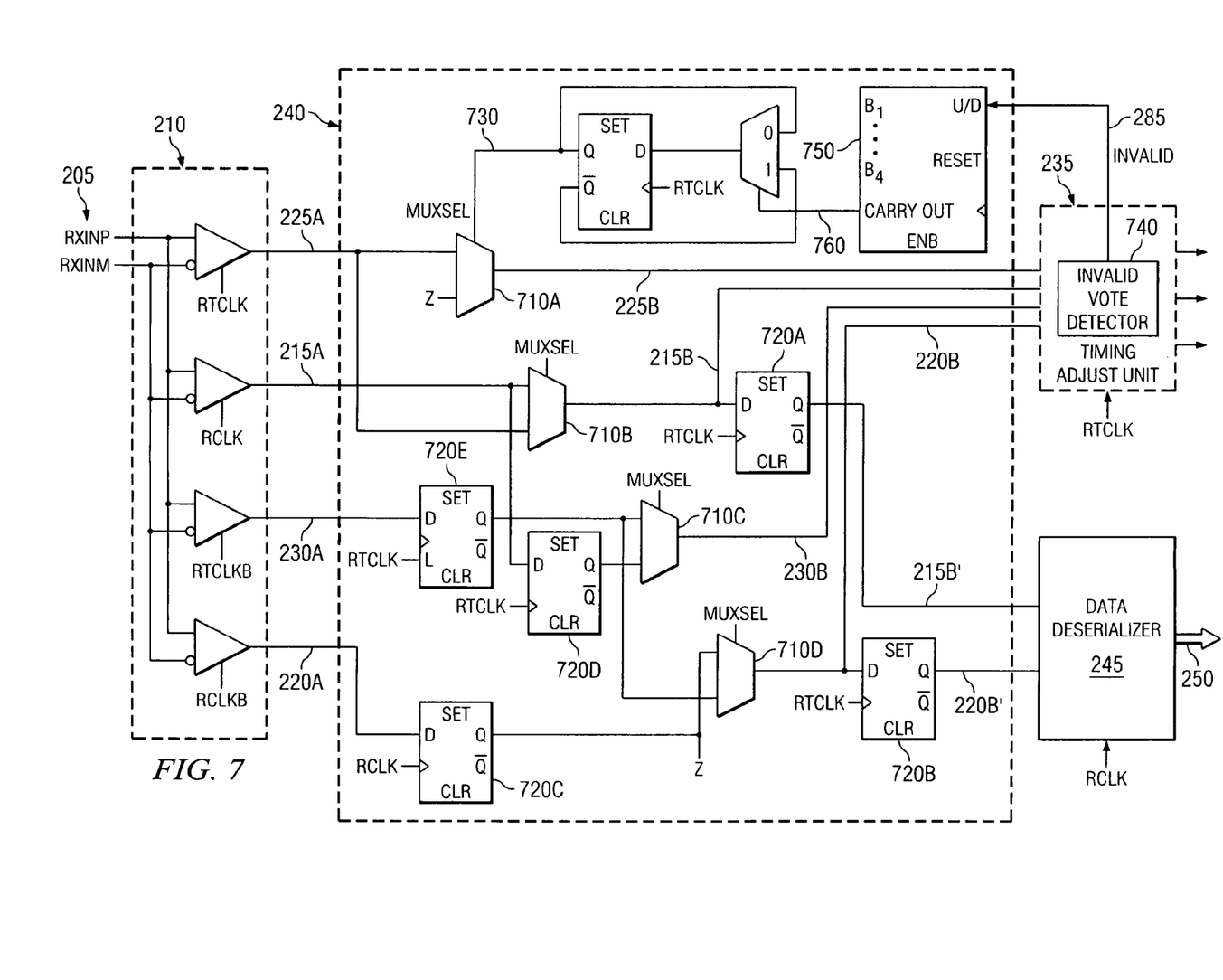
FIG. 7 is a block diagram of an example timing jump unit that may be used to implement the example timing update unit of FIG. 2.

A block diagram of an example implementation of the timing jump unit 240 that may be used to implement the example timing update unit 150 of FIG. 2 is illustrated in FIG. 7. For convenience, the block diagram of FIG. 7 also includes relevant blocks from the example implementation of the OLT 125 illustrated in FIG. 2. As such, like blocks and signals in FIGS. 2 and 7 are labeled with the same reference numerals.

In accordance with the example of FIG. 2, the example timing jump unit 240 of FIG. 7 accepts as inputs the data samples 225A, 215A, 230A and 220A output by the data sampler 210. Because the lead sampling clock (RTCLK and RTCLKB) samples the upstream signal in advance of the receive sampling clock (RCLK and RCLKB) by one half of a bit interval, the data samples occur in the order 225A, 215A, 230A and 220A. The example timing jump unit 240 further includes the set of outputs providing the data samples 225B, 215B, 215B', 230B, 220B and 220B' as shown. In the illustrated example, the data samples 225B are associated with RTCLK, the data samples 215B and 215B' are associated with RCLK, the data samples 230B are associated with RTCLKB and the data samples 220B and 220B' are associated with RCLKB. The example timing jump unit 240 provides the data samples 225B, 215B, 230B and 220B to the example timing adjust unit 235 and the data samples 215B' and 220B' to the data deserializer 245 as shown and discussed above in connection with FIG. 2. Because the data samples 215B' are associated with RCLK and the data samples 220B' are associated with RCLKB, the data deserializer 245 is configured to interleave and buffer the data streams 215B' and 220B' to output a digital word containing the detected upstream data via the data output 250.

The example timing jump unit 240 of FIG. 7 interposes a set of multiplexers 710A, 710B, 710C and 710D, a set of D flip-flops 720A, 720B, 720C, 720D, and a transparent latch flip-flop 720E between the data samples 225A, 215A, 230A and 220A and the data samples 225B, 215B, 230B and 220B. The set of multiplexers 710A-710D and the set of flip-flops 720A-720E interchange the data samples corresponding to the receive sample clock (RCLK and RKLCB) with the data samples corresponding to the lead sample clock (RTCLKB and RTCLK) to implement the one half bit timing jump seen from the perspective of the data deserializer 245. This data sample interchange is controlled via a mux select signal 730 (denoted as MUXSEL in FIG. 7). When the mux select signal 730 is not asserted (e.g., corresponding to a logic 0 value), the set of multiplexers 710A-710D are configured to allow the data samples 225A, 215A, 230A and 220A to pass through and become the data samples 225B, 215B, 215B', 230B, 220B and 220'. In this configuration, no timing jump is implemented.

However, when the mux select signal 730 is asserted (e.g., corresponding to a logic 1 value), the set of multiplexers 710A-710D are configured to pass the data samples 225A, 215A, 230A and 220A in an interchanged order. In particular, the multiplexer 710A causes the data samples 225B to correspond to the data samples 220A, the multiplexer 710B causes the data samples 215B and 215B' to correspond to the data samples 225A, the multiplexer 710C causes the data samples 230B to correspond to the data samples 215A, and the multiplexer 710D causes the data samples 220B and 220B' to correspond to the data samples 230A. As such, the data samples 215B and 215B' now correspond to RTCLK and the data samples 220B and 220B' now correspond to RTCLKB. Similarly, the data samples 225B now correspond to RCLKB and the data samples 230B now correspond to RCLK. As discussed above in connection with FIG. 2, the lead sampling clock is offset from the receive sampling clock by one half of a bit interval. Because the data deserializer 245 processes the data samples 215B' and 220B' to produce the detected upstream data, but the data samples 215B' and 220B' now correspond to the lead sampling clock (RTCLK and RTCLKB) instead of the receive sampling clock (RCLK and RCLKB), an apparent sample timing jump of one half of a bit interval has occurred from the perspective of the data deserializer 245. Thus, when the mux select signal 730 is asserted, the timing jump unit 240 of the illustrated example implements a timing jump of one half of a bit interval from the perspective of the data deserializer 245.

Control of the mux select signal 730 is based on the occurrence of an invalid output 285 from the example timing adjust unit 235. As discussed above in connection with FIG. 2, the example timing adjust unit 235 will typically assert the invalid output 285 when the sampling phases of the receive and lead sampling clocks are early (or late) by approximately one half of a bit interval. When the sampling phases are this far offset from their desired positions, the receive sampling clock may cause the upstream data signal to be sampled at the edges of the bit intervals, rather than in the center of the bit intervals. To detect such a scenario, the example timing adjust unit 235 includes an invalid vote detector 740. The invalid vote detector 740 may be implemented, for example, based on the entries 545 and 550 of the example truth table 500 of FIG. 5. Accordingly, the example invalid vote detector 740 may be configured to compare three adjacent data sample from the data samples 225B, 215B, 230B and 220B to determine whether the three adjacent samples have alternating values. If so, the invalid vote detector 740 asserts the invalid output 285.

The example timing jump unit 240 of FIG. 7 further includes a counter 750 to count the number invalid outputs 285 asserted by the timing adjust unit 235. The counter 750 asserts a carry out bit 760 when a threshold count value is reached. The carry out bit 760 is used to control when the mux select signal 730 is asserted, thereby initiating a timing jump. The use of the counter 750 reduces the possibility that single or infrequent invalid outputs 285 will cause the example timing jump unit 240 to implement a timing jump.

Figures 8A, 8B:
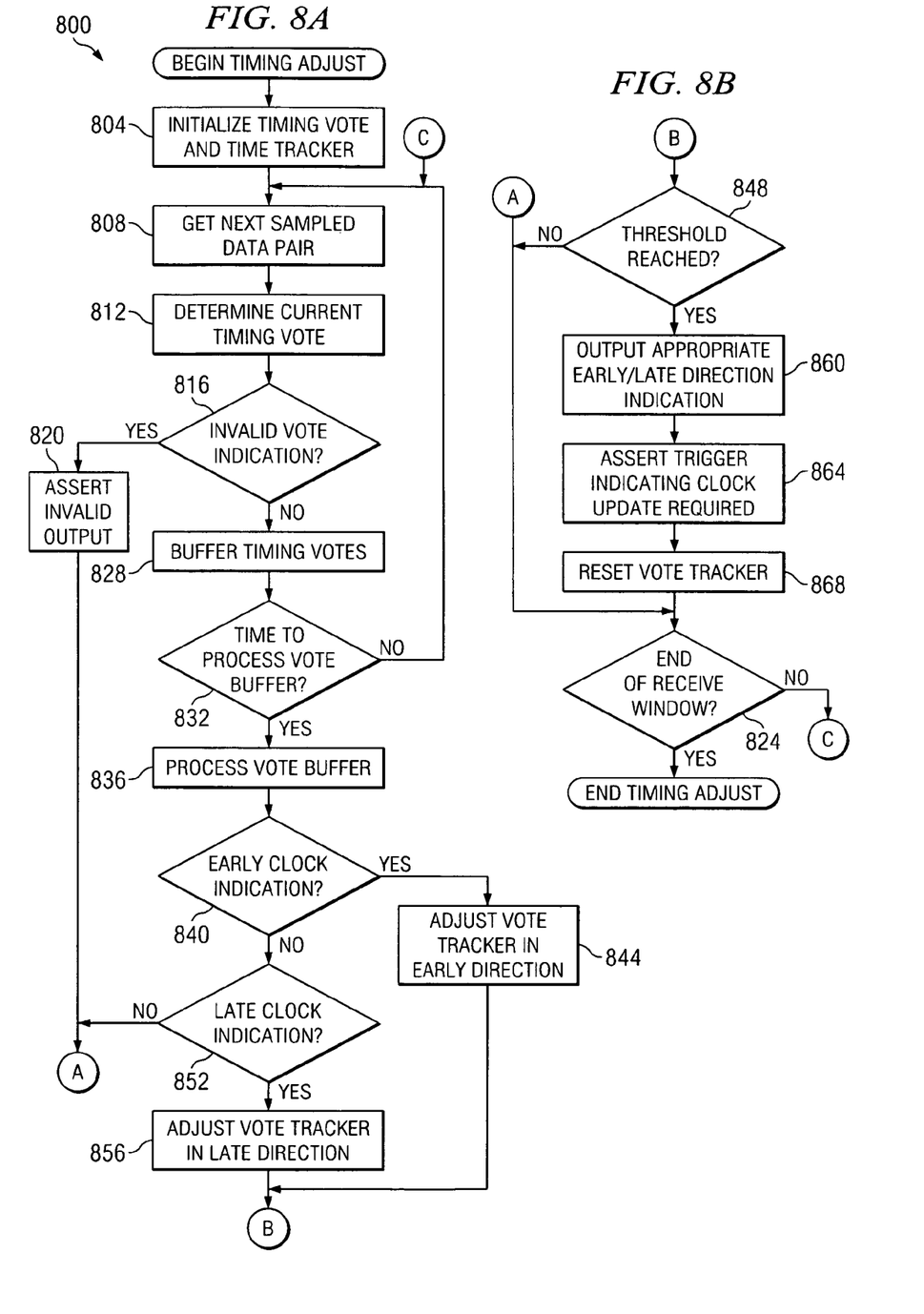
FIGS. 8A-8B collectively form a flowchart representative of example machine readable instructions that may be executed to implement the example timing adjust unit of FIG. 4.
Figure 9:
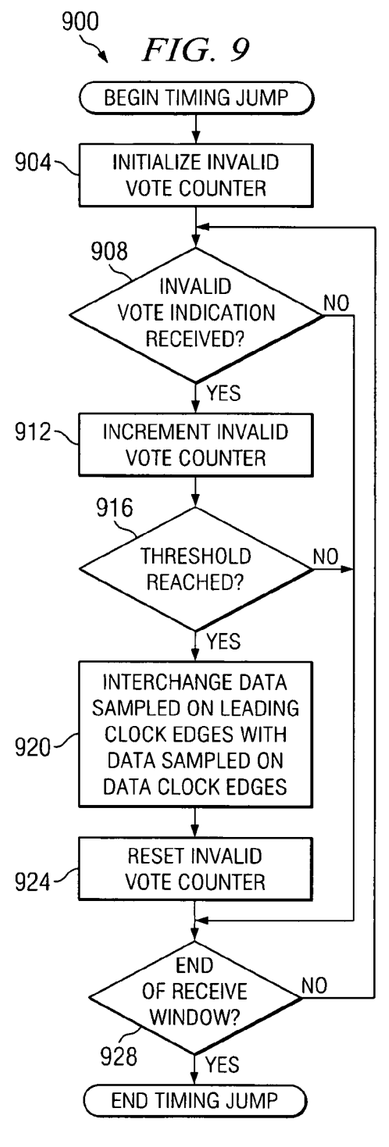
FIG. 9 is a flowchart representative of example machine readable instructions that may be executed to implement the example timing jump unit of FIG. 7.

Flowcharts representative of example machine readable instructions that may be executed to implement the communication network 100, the OLT 125, the timing update unit 150, the data sampler 210, the timing adjust unit 235, the timing jump unit 240, the data deserializer 245, the clock phase adjuster 265, the early/late voting unit 410, the vote tracker 430, the adjustment decision unit 445, the consecutive vote tracker 450, the shift register 610, the shifter control logic 660, the set of multiplexers 710A-710D, the D flip-flops 720A-720C, the invalid vote detector 740 and/or the counter 750 the are shown in FIGS. 8A-8B and 9. In these examples, the machine readable instructions represented by each flowchart may comprise one or more programs for execution by: (a) a processor, such as the processor 1012 shown in the example computer 1000 discussed below in connection with FIG. 10, (b) a controller, and/or (c) any other suitable device. The one or more programs may be embodied in software stored on a tangible medium such as, for example, a flash memory, a CD-ROM, a floppy disk, a hard drive, a DVD, or a memory associated with the processor 1012, but persons of ordinary skill in the art will readily appreciate that the entire program or programs and/or portions thereof could alternatively be executed by a device other than the processor 1012 and/or embodied in firmware or dedicated hardware (e.g., implemented by an application specific integrated circuit (ASIC), a programmable logic device (PLD), a field programmable logic device (FPLD), discrete logic, etc.). For example, any or all of the communication network 100, the OLT 125, the timing update unit 150, the data sampler 210, the timing adjust unit 235, the timing jump unit 240, the data deserializer 245, the clock phase adjuster 265, the early/late voting unit 410, the vote tracker 430, the adjustment decision unit 445, the consecutive vote tracker 450, the shift register 610, the shifter control logic 660, the set of multiplexers 710A-710D, the D flip-flops 720A-720C, the invalid vote detector 740 and/or the counter 750 could be implemented by any combination of software, hardware, and/or firmware. Also, some or all of the machine readable instructions represented by the flowcharts of FIGS. 8A-8B and 9 may be implemented manually. Further, although the example machine readable instructions are described with reference to the flowcharts illustrated in FIGS. 8A-8B and 9, persons of ordinary skill in the art will readily appreciate that many other techniques for implementing the example methods and apparatus described herein may alternatively be used. For example, with reference to the flowcharts illustrated in FIGS. 8A-8B and 9, the order of execution of the blocks may be changed, and/or some of the blocks described may be changed, eliminated, combined and/or subdivided into multiple blocks.

Example machine readable instructions 800 that may be executed to implement the example timing adjust unit 235 of FIGS. 2, 4 and/or 7 are shown in FIGS. 8A-8B. The example machine readable instructions 800 may be executed continuously, at predetermined intervals, based on an occurrence of a predetermined event, etc., or any combination thereof. For example, execution of the machine readable instructions 800 may be initiated at the beginning of each time slot of the TDMA upstream protocol used by the example communication network 100 to transmit upstream data from the ONUs 110A, 110B and 110C to the OLT 125. The machine readable instructions 800 begin execution at block 804 of FIG. 8A at which the timing adjust unit 235 initializes its current timing vote determination and a time tracker used to track timing votes. For example, at block 804 the timing adjust unit 235 could initialize the early vote 415, the late vote 420, the none output 425 and the invalid output 285 of FIG. 5, as well as initialize the shift register 610 of FIG. 6.

Next, control proceeds to block 808 at which the timing adjust unit 235 obtains the next pair of adjacent data samples. For example, at block 808 the early/late voting unit 410 included in the timing adjust unit 235 may obtain the next pair of adjacent data samples in the input data stream 405. Control proceeds to block 812 at which the timing adjust unit 235 determines a current timing vote based on the pair of adjacent data samples obtained at block 808. For example, at block 812 the early/late voting unit 410 may compare the adjacent data samples and assert the early vote 415 when the adjacent data samples have substantially different values, and assert the later vote 420 when the adjacent samples have substantially similar values. Furthermore, at block 812 the early/late voting unit 410 may compare the most recent three adjacent samples according to the example truth table 500 of FIG. 5 to determine, for example, whether a bit transition has occurred such that an early vote or a late vote is meaningful. Additionally, at block 812 the early/late voting unit 410 compares the most recent three adjacent samples according to the example truth table 500 to determine whether an invalid vote indication should be asserted. For example, three adjacent samples having alternating values provide an indication that the sampling phase of the receive sampling clock corresponds substantially to the edge of a bit interval rather than to the center of a bit interval. Sampling at the edges of the bit intervals may yield erroneous data detection and, thus, the timing adjust unit 235 will issue an invalid vote indication in such as case. Control then proceeds to block 816.

At block 816, the timing adjust unit 235 determines whether an invalid vote indication was issued at block 816. If an invalid vote indication was issued (block 816), control proceeds to block 820 at which the timing adjust unit 235 asserts an invalid output for use by, for example, the timing jump unit 240 of FIGS. 2 and/or 7. For example, at block 820 the early/late voting unit 410 may assert the invalid output 285 when the three adjacent sample correspond to the entries 545 or 550 of the example truth table 500. Control then proceeds to block 824 of FIG. 8B.

If, however, an invalid vote indication was not issued (block 816), control proceeds to block 828 at which the timing adjust unit 235 stores the current timing vote determined at block 812 in a buffer. For example, at block 828 the timing adjust unit may buffer the indications provided by the early vote 415, the late vote 420 and/or the none output 425. Next, at block 832 the timing adjust unit 235 determines whether it is time to process the vote buffer. For example, the timing adjust unit 235 may be configured to process pairs of timing votes as discussed above in connection with FIG. 6. If it is not time to process the vote buffer (block 832), control returns to block 808 and blocks subsequent thereto at which the timing adjust unit 235 determines another timing vote based on the next pair of adjacent data samples.

However, if it is time to process the vote buffer (block 832), control proceeds to block 836 at which the timing adjust unit 235 processes the timing votes stored in the vote buffer. For example, at block 836 the shifter control logic 660 included in the vote tracker 430 of FIG. 6 may process pairs of votes to determine whether and in which direction to shift the shift register 610 that tracks the running difference between the number of early votes 415 and late votes 420. Then, at block 840 the timing adjust unit 235 determines whether the vote buffer indicates that the sampling phases of the receive and lead sampling clocks are early relative to the center of a bit interval. If the vote buffer indicates that the sampling phases are early (block 840), control proceeds to block 844 at which the vote tracker 430 included in the timing adjust unit 235 is adjusted in the early direction. For example, at block 844 the shift register 610 of FIG. 6 may be adjusted in the early direction such that an appropriate number of logic 0 values are shifted into the shift register 610. Control then proceeds to block 848 of FIG. 8B.

If, however, the vote buffer indicates that the sampling phases are not early (block 840), control proceeds to block 852 at which the timing adjust unit 235 determines whether the vote buffer indicates that the sampling phases of the receive and lead sampling clocks are late relative to the center of a bit interval. If the vote buffer indicates that the sampling phases are late (block 852), control proceeds to block 856 at which the vote tracker 430 included in the timing adjust unit 235 is adjusted in the late direction. For example, at block 856 the shift register 610 of FIG. 6 may be adjusted in the late direction such that an appropriate number of logic 1 values are shifted into the shift register 610. Control then proceeds to block 848 of FIG. 8B. However, if the vote buffer indicates that the sampling phases are not late (block 852), the vote tracker is not adjusted and control proceeds to block 824 of FIG. 8B.

At block 848 of FIG. 8B, the timing adjust unit 235 determines whether a threshold has been reached indicating that the sampling phases of the receive and lead sampling clocks should be adjusted. For example, at block 848 the vote tracker 430 may determine whether the shift register 610 has reached the empty state causing the early flag 435 to be asserted, or whether the shift register 610 has reached the full state causing the late flag 440 to be asserted. If the threshold has not been reached (block 848), control proceeds to block 824. If, however, the threshold is reached (block 848), control proceeds to block 860 at which the timing adjust unit 235 outputs a direction indication to indicate an appropriate sampling phase correction based on whether the sampling phases are early or late. For example, at block 860 the adjustment decision unit 445 included in the timing adjust unit 235 may output a retard timing indication on the direction output 255 when the threshold determination at block 848 indicates that the number of early votes has exceeded the number of late votes by the threshold. Conversely, at block 860 the adjustment decision unit 445 may output an advance timing indication on the direction output 255 when the threshold determination at block 848 indicates that the number of late votes has exceeded the number of early votes by the threshold.

Next control proceeds to block 864 at which the timing adjust unit 235 asserts a trigger indicating that a sampling clock timing update is required. For example, at block 864 the adjustment decision unit 445 may assert the trigger output 260 indicating that a sampling phase adjustment should be performed by, for example, the clock phase adjuster 265 of FIG. 2 in the direction indicated at block 860. Control then proceeds to block 868 at which the timing adjust unit 235 resets the vote tracker. For example, at block 868 the vote tracker 430 may reset the shift register 610 to its initial state. Then, control proceeds to block 824 at which the timing adjust unit 235 determines whether the end of the current data receiving window has been reached. For example, at block 824 the timing adjust unit 235 may determine whether the end of the current upstream TDMA slot has been reached. If the end of the receive window has not been reached (block 824), control returns to block 808 and blocks subsequent thereto at which the timing adjust unit 235 determines another timing vote based on the next pair of adjacent data samples. However, if the end of the receive window has been reached (block 824), execution of the example machine readable instructions 800 then ends.

Example machine readable instructions 900 that may be executed to implement the example timing jump unit 240 of FIGS. 2 and/or 7 are shown in FIG. 9. The example machine readable instructions 900 may be executed continuously, at predetermined intervals, based on an occurrence of a predetermined event, etc., or any combination thereof. For example, execution of the machine readable instructions 900 may be initiated at the beginning of each time slot of the TDMA upstream protocol used by the example communication network 100 to transmit upstream data from the ONUs 110A, 110B and 110C to the OLT 125. The machine readable instructions 900 begin execution at block 904 at which the timing jump unit 240 initializes a counter use to count a number of invalid vote indications. For example, at block 904 the timing jump unit 240 may initialize the counter 750 used to count the number of invalid indications received from the timing adjust unit 236 via the invalid output 285.

Next, control proceeds to block 908 at which the timing jump unit 240 determines whether an invalid vote indication has been received from, for example, the timing adjust unit 235. If an invalid vote indication is received (block 908), control proceeds to block 912 at which the timing jump unit 240 increments the counter that was initialized at block 904. For example, at block 912 the timing jump unit 240 may increment the counter 750 each time the invalid output 285 is asserted. Control then proceeds to block 916 at which the timing jump unit 240 determines whether the value of the counter incremented at block 912 has reached a threshold. For example, at block 916 the timing jump unit 240 may determine whether the carry output 760 of the counter 750 has been asserted indicating that the threshold value has been reached.

If the threshold value has been reached (block 916), control proceeds to block 920 at which the timing jump unit 240 interchanges the data samples corresponding to the receive sample clock with the data samples corresponding to the lead sample clock to implement a one half bit timing jump. For example, at block 920 the set of multiplexers 710A-710D are configured, in response to an asserted mux select signal 730, to interchange the data samples such that data samples associated with RCLK actually correspond to RTCLK, data samples associated with RTCLKB actually correspond to RCLK, data samples associated with RCLKB actually correspond to RTCLKB and data samples associated with RTCLK actually correspond to RCLKB. Because the data samples associated with RCLK and RCLKB actually correspond to RTCLK and RTCLKB, respectively, and because RTCLK/ RTCLKB is offset from RCLK/RCLKB by a half bit interval, this interchange results in an apparent half bit interval timing jump from the perspective of the data deserializer 245.

Figure 10:
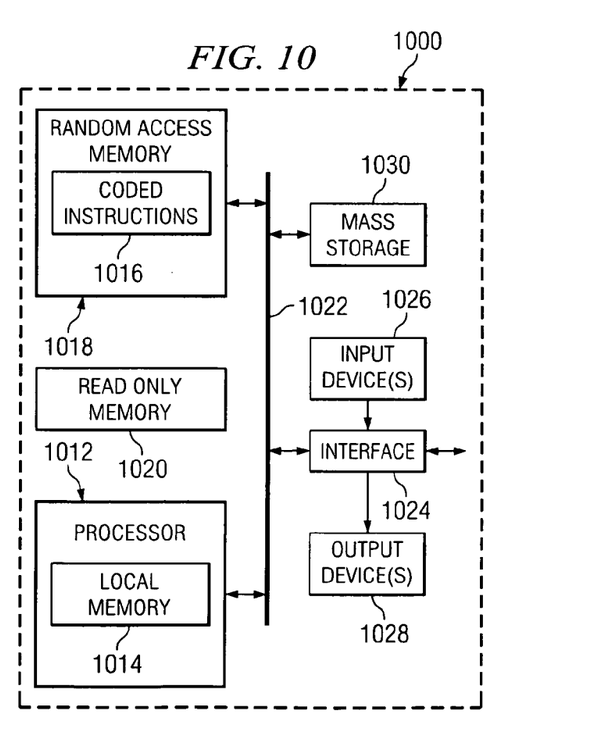
FIG. 10 is a block diagram of an example computer that may execute the example machine readable instructions of FIGS. 8A-8B and/or 9 to implement the example timing update unit of FIG. 2.

Control next proceeds to block 924 at which the timing jump unit 240 resets the invalid vote counter. For example, at block 924 the timing jump unit 240 may reset the counter 750. Then, after the counter is reset at block 924, or if the counter threshold value has not been reached (block 916), or if an invalid vote indication is not received (block 908), control proceeds to block 928. At block 928 the timing jump unit 240 determines whether the end of the current data receiving window has been reached. For example, at block 928 the timing jump unit 240 may determine whether the end of the current upstream TDMA slot has been reached. If the end of the receive window has not been reached (block 928), control returns to block 908 and blocks subsequent thereto at which the timing jump unit 240 determines whether another invalid vote indication has been received. However, if the end of the receive window has been reached (block 928), execution of the example machine readable instructions 900 then ends FIG. 10 is a block diagram of an example computer 1000 capable of implementing the apparatus and methods disclosed herein. The computer 1000 can be, for example, a server, a personal computer, a personal digital assistant (PDA), an Internet appliance, a DVD player, a CD player, a digital video recorder, a personal video recorder, a set top box, or any other type of computing device.

The system 1000 of the instant example includes a processor 1012 such as a general purpose programmable processor. The processor 1012 includes a local memory 1014, and executes coded instructions 1016 present in the local memory 1014 and/or in another memory device. The processor 1012 may execute, among other things, the machine readable instructions represented in FIGS. 8A-8B and 9. The processor 1012 may be any type of processing unit, such as one or more microprocessors from the Texas Instruments OMAP® family of microprocessors. Of course, other processors from other families are also appropriate.

The processor 1012 is in communication With a main memory including a volatile memory 1018 and a non-volatile memory 1020 via a bus 1022. The volatile memory 1018 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1020 may be implemented by flash memory and/or any other desired type of memory device. Access to the main memory 1018, 1020 is typically controlled by a memory controller (not shown).

The computer 1000 also includes an interface circuit 1024. The interface circuit 1024 may be implemented by any type of interface standard, such as an Ethernet interface, a universal serial bus (USB), and/or a third generation input/output (3GIO) interface.

One or more input devices 1026 are connected to the interface circuit 1024. The input device(s) 1026 permit a user to enter data and commands into the processor 1012. The input device(s) can be implemented by, for example, a keyboard, a mouse, a touchscreen, a track-pad, a trackball, an isopoint and/or a voice recognition system.

One or more output devices 1028 are also connected to the interface circuit 1024. The output devices 1028 can be implemented, for example, by display devices (e.g., a liquid crystal display, a cathode ray tube display (CRT)), by a printer and/or by speakers. The interface circuit 1024, thus, typically includes a graphics driver card.

The interface circuit 1024 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The computer 1000 also includes one or more mass storage devices 1030 for storing software and data. Examples of such mass storage devices 1030 include floppy disk drives, hard drive disks, compact disk drives and digital versatile disk (DVD) drives. The mass storage device 1030 may store the current state of the shift register 610 included in the vote tracker 430. Alternatively, the volatile memory 1018 may store the current state of the shift register 610 included in the vote tracker 430.

As an alternative to implementing the methods and/or apparatus described herein in a system such as the device of FIG. 10, the methods and or apparatus described herein may be embedded in a structure such as a processor and/or an ASIC (application specific integrated circuit).

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
    determining a vote based on adjacent samples occurring within a single bit interval in a sampled data stream, wherein the vote comprises an early vote when the adjacent samples indicate a sampling phase of a sampling clock is early relative to a center position in the bit interval by determining an early vote when two adjacent samples have substantially similar values and wherein the vote comprises a late vote when adjacent samples indicate the sampling phase is late relative to the center position by determining a late vote when the two adjacent samples have substantially different values;
    tracking a running difference between a number of early votes and a number of late votes in a plurality of votes corresponding to a plurality of adjacent samples; and
    adjusting the sampling phase when the running difference reaches a threshold.

2. The method claim 1 wherein the step of tracking the running difference between the number of early votes and the number of late votes further comprises shifting a shift register in a first direction for each early vote in the plurality of votes and shifting the shift register in a late direction for each late vote in the plurality of votes.

3. The method of claim 2 wherein a current state of the shift register relative to an initialized state tracks the running difference between the number of early votes and the number of late votes.

4. The method of claim 2 wherein a full state of the shift corresponds to the running difference reaching the threshold.

5. The method of claim 4 wherein adjusting the sampling phase when the running difference reaches the threshold comprises at least one of retarding the sampling phase or advancing the sampling phase when shift register is shifted to the full state.

6. The method of claim 2 wherein an empty state of the shift register corresponds to the running difference reaching the threshold.

7. The method of claim 6 wherein adjusting the sampling phase when the running difference reaches the threshold comprises at least one of retarding the sampling phase or advancing the sampling phase when shift register is shifted to the empty state.

8. The method of claim 1 wherein adjusting the sampling phase when the running difference reaches the threshold comprises at least one of retarding the sampling phase when the number of early votes exceeds the number of late votes by the threshold or advancing the sampling phase when the number of late votes exceeds the number of early votes by the threshold.

9. The method of claim 1 wherein the sampling clock comprises a first sampling clock, wherein the sampled data stream comprises an interleaving of a first data stream and a second data stream, wherein the first data stream is produced by sampling a signal based on the first sampling clock, and wherein the second data stream is produced by sampling the signal based on a second sampling clock offset from the first sampling clock.

10. The method of claim 9 further comprising interchanging the interleaving of the first data stream and the second data stream when the sampling phase of the first sampling clock corresponds substantially to an edge position in the bit interval.

11. The method of claim 10 further comprising determining whether the sampling phase corresponds substantially to the edge position based on three adjacent samples in the sampled data stream.

12. The method of claim 11 wherein the three adjacent samples indicate that the sampling phase corresponds substantially to the edge position when the three adjacent samples have alternating values.

13. An apparatus comprising:
    a voting unit to determine an early vote when adjacent samples occurring within a bit interval correspond to a sampling phase of a sampling clock being early relative to a center position of the bit interval and to determine a late vote when the adjacent samples correspond to the sampling phase being late relative to the center position, wherein the voting unit determines the early vote when the adjacent samples have substantially similar values and wherein the voting unit determines the late vote when the adjacent samples have substantially different values, wherein the vote tracker includes a shift register configured to shift in a first direction for each early vote and in a second direction for each late vote;
    a vote tracker to track a running difference between a number of early votes and a number of late votes corresponding to a plurality of adjacent samples; and
    a decision unit to initiate a phase adjustment based on an output from the vote tracker.

14. The apparatus of claim 13 wherein the vote tracker outputs at least one of an early flag indicating the sampling phase is early or a late flag indicating the sampling phase is late when at least one of an empty state of the shift register is reached or a full state of the shift register is reached.

15. The apparatus of claim 14 wherein the decision unit asserts a trigger output when at least one of the early flag or the late flag is received from the vote tracker, and wherein the decision unit further outputs a direction indication indicating a direction to adjust the sampling phase of the sample clock.

16. The apparatus of claim 14 further comprising a consecutive vote checker configured to output a first indication when a predetermined number of consecutive early votes are determined and a second indication when a predetermined number of consecutive late votes are determined.

17. A system comprising:
    a data sampler to oversample a signal to produce a sampled data stream, wherein any two adjacent data samples in the data stream occur within a single bit interval;
    a timing adjust unit to determine whether to adjust a sampling phase of a sampling clock towards a center position of the bit interval, wherein the timing adjust unit outputs an early flag when a number of early votes exceeds a number of late votes by a first threshold, wherein the timing adjust unit outputs a late flag when the number of late votes exceeds the number of early votes by a second threshold, wherein an early vote corresponds to two adjacent data samples having substantially similar values, and wherein a late vote corresponds to two adjacent sample having substantially different values; and a clock phase adjuster to adjust the sampling phase of the sampling clock based on receipt of at least one of the early flag or the late flag.

18. The system of claim 17 further comprising a timing jump unit to interchange adjacent data samples in the data stream when three adjacent data samples in the data stream indicate that the sampling phase of the sampling corresponds substantially to an edge of the bit interval.

19. An apparatus comprising:
a data sampler that receives a differential input signal;
a timing jump circuit that is coupled to the data sampler;
a timing adjust circuit having:
an early/late voting circuit that is coupled to the timing jump circuit;
a vote tracker that is coupled to the early/late voting circuit, wherein the vote tracker counts a number of early votes and a number of late votes, and wherein the vote tracker is adapted to assert an early vote flag when the number of early votes exceed a first predetermined threshold, and wherein the vote tracker is adapted to assert a late vote flag when the number of late flags exceeds a second predetermined threshold; and
an adjustment circuit that is coupled to the vote tracker;
a clock phase adjustment circuit that receives a reference clock signal and that is coupled to the adjustment circuit; and
a deserializer that is coupled to the timing jump circuit.

20. The apparatus of claim 19, wherein the vote tracker further comprises:
shifter control logic that is coupled to the early/late voting circuit; and
a shift register that is coupled to the early/late voting circuit and the shifter control logic.

21. The apparatus of claim 20, wherein the shift register further comprises a plurality of multiplexers and a plurality of D flip-flops.

22. The apparatus of claim 21, wherein the apparatus further comprises a consecutive vote checker circuit that is coupled to the early-late voting circuit and the adjustment circuit.

23. The apparatus of claim 22, wherein an early vote corresponds to two adjacent data samples having substantially similar values, and wherein a late vote corresponds to two adjacent sample having substantially different values.

* * * * *